United States Patent [19]
Mize

[11] 3,914,895
[45] Oct. 28, 1975

[54] FISH LURE
[76] Inventor: Norman W. Mize, 7154 London Lane, Apt. C, Lemon Grove, Calif. 92045
[22] Filed: Nov. 20, 1974
[21] Appl. No.: 525,501

[52] U.S. Cl. ............... 43/42.05; 43/42.06; 43/42.1; 43/42.28; 43/42.4
[51] Int. Cl.² ......................................... A01K 85/00
[58] Field of Search............ 43/42.28, 42.29, 42.05, 43/42.1, 42.4, 42.41, 42.06, 42.35, 43.2

[56] References Cited
UNITED STATES PATENTS
| | | | |
|---|---|---|---|
| 1,515,849 | 11/1924 | Eppinger | 43/42.4 |
| 2,241,367 | 5/1941 | Sarff | 43/42.1 |
| 2,258,080 | 10/1941 | Thomas et al. | 43/42.28 |

*Primary Examiner*—Warner H. Camp
*Attorney, Agent, or Firm*—Tom Sherrard

[57] ABSTRACT

A fish lure having a hollow cylindrical body with a channel for a leader through the center of one end and a funnel configuration to accommodate usual skirts on the inside of the other end of the body.

1 Claim, 6 Drawing Figures

FISH LURE

BACKGROUND OF INVENTION

In the quest for big game fish, such as marlin, dolphin, yellowtail and barracuda, various artificial metal lures, having plastic skirts have been devised to combine as many desired features as possible. Natural appearance and action is desired to attract fish. A quick and easy means to change skirts and conventional hooks is desirable. Low cost of manufacture is also important.

SUMMARY OF INVENTION

I have provided a simple lure which, for the first time, combines desired features by providing a hollow body portion with a funnel shaped end and with a simple channel at the opposite end. In such hollow body portion the usual leader may be placed with connections, including a novel snap arrangement, to a conventional hook without the requirement of special hooks. To avoid the usual chore and inconvenience of affixing the skirt to the outside of a portion (reduced in size) of the lure body, I have provided a novel funnel shaped body end portion whereby the usual skirt may be placed on the leader-hook linkage for pulling into a portion of the hollow portion of the body.

BRIEF DESCRIPTION OF THE DRAWING

In the accompanying drawing

DESCRIPTION OF PREFERRED EMBODIMENTS

Figure 1:
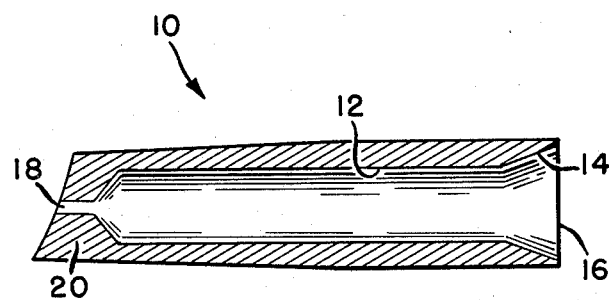
FIG. 1 is a side elevation cross-sectional view of the lure body portion.
Figure 2:
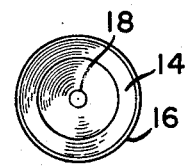
FIG. 2 is an end view thereof.
Figure 3:
FIG. 3 is a perspective view thereof.

With continued reference to the drawings forming a part hereof, the numeral 10 depicts the entire lure body. It is preferably made of stainless steel with a conventional outside cylindral configuration, except however, one end section thereof is not reduced in size to accommodate a plastic skirt which is usually tied thereto. Reference number 12 is a cylindrical shaped cavity barreled out of the inside of the body portion. As a novel contribution to the art, I have provided a funnel shaped end portion 14 on the inside of one end 16 of the body. At the opposite end through solid head 20 of the body I have provided the usual relatively small channel portion 18 through which the usual fish line leader 28 is strung. Having this large hollow or cavity portion, the entire lure assembly may consist of conventional hooks 40 and 40a fastened in tandem, by line 39 (which may have usual beads). The hook shafts may be positioned within the cavity portion in various degrees and may be connected to leader 28 by usual clamp 32 and knot 34, to which I have added a snap fastener 36, as illustrated. It remains connected to a hook. This fastener 36 permits a quick and easy change of hooks and skirts by simply unsnapping it from the leader. The snap is made practical by my novel cavity. Because of the funnel 14 having tapered inside walls, a tapered nose section of plastic or other skirt 38 may be integral with the linkage and pulled into a portion of the hollow body. It is protected in use and may always be changed quickly and easily.

Figure 4:
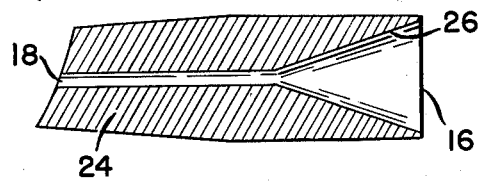
FIG. 4 is a side elevation cross-sectional view of a modification of the body portion.
Figure 5:
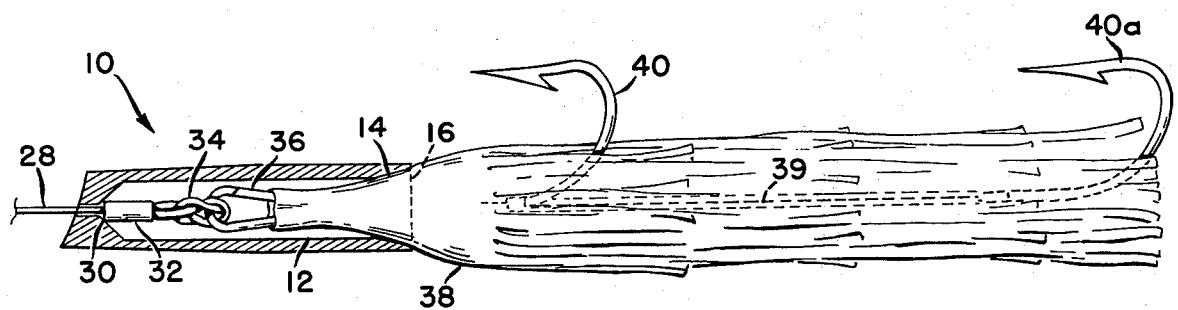
FIG. 5 is the same as that of FIG. 1 provided with hooks and a skirt assembly.
Figure 6:
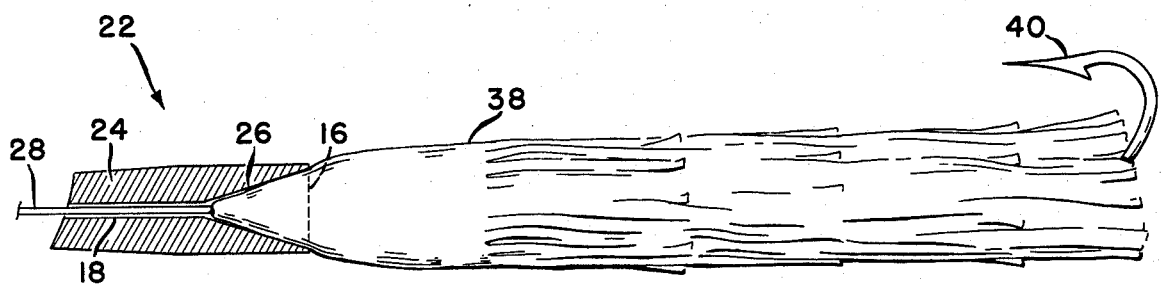
FIG. 6 is the same as that of FIG. 4 provided with a skirt and single hook.

The form of my invention shown in FIGS. 1 and 5, as described will accommodate one or two hooks. The modification 22 of FIGS. 4 and 6 deletes cavity 12 with resulting relatively larger solid body 24. It has the novel inside funnel configuration at one end with tapered walls 26 to mate with the tapered walls of skirt 38 as can be seen in FIG. 6. Under this alternative only a single hook assembly appears practical.

As can be seen in all the accompanying illustrations of my device, the body portion has an exterior frontal portion of substantially flat configuration. It is preferably slightly arcuate and slightly oblique in respect to the sides of the body portion. These important unique features, combined with the other described parts, cause a hard-to-achieve most desirable result. The motion in water is very attractive to fish. When the nose of the lure surfaces, even for an instant, air comes in the front driving water from the internal channel and cavity and out the rear. The channel, having water replaced by air, makes a long air bubble trail as the nose, again under water, now receives water in the front to drive air out the rear. Not unlike natural fish which cause air bubbles or froth when they thrash about at and near the surface, my invention attracts fish by the combination of its movements and stream of air bubbles as it is trolled at the speed of natural fish. The air comes out in a long stream, adding to the illusion of naturalness. For example, marlin chasing flying fish, commonly swim at about 20 mph. My lure retains its stability, lifelike action, and desired action characteristics at speeds in the range of 5 to 25 mph.

I Claim:

1. In combination:
   a. a hollow cylindrical shaped body portion,
   b. a funnel shaped end portion on the inside of one end of the body portion,
   c. an exterior frontal portion on the opposite end of the body portion having a substantially flat, slightly arcuate, slightly oblique configuration in respect to the sides of the body portion,
   d. a cylindrical shaped cavity portion centrally located in the body portion being integral with the end portion,
   e. a channel portion provided in the body portion forming an open conduit from the outside front of the body portion to the cavity portion,
   f. fish hook means having a skirt connected thereto within the cavity, and
   g. a leader, one end of which is connected by suitable linkage to the fish hook means within the cavity, another portion of which extends through the channel portion for usual connection to a fish line.

* * * * *